(12) United States Patent
Kumaki et al.

(10) Patent No.: US 6,617,381 B1
(45) Date of Patent: *Sep. 9, 2003

(54) POLYAMIDE RESIN COMPOSITION AND FORMING FROM THE SAME

(75) Inventors: Jiro Kumaki, Nagoya (JP); Mitsunari Sotokawa, Nagoya (JP); Kouzou Murata, Nagoya (JP); Koya Kato, Nagoya (JP)

(73) Assignee: Toray Industries, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,817

(22) Filed: Mar. 4, 1998

(30) Foreign Application Priority Data

| Mar. 7, 1997 | (JP) | 9-053205 |
| Mar. 7, 1997 | (JP) | 9-053206 |
| Aug. 7, 1997 | (JP) | 9-213751 |

(51) Int. Cl.$^7$ .................. C08K 5/1539; C08K 3/26; C08K 3/34; C08K 3/22; C08K 3/36; C08K 3/40

(52) U.S. Cl. .................. 524/112; 524/413; 524/414; 524/425; 524/433; 524/444; 524/445; 524/447; 524/449; 524/450; 524/451; 524/456; 524/514; 524/606; 524/607; 525/426

(58) Field of Search .................. 524/606, 607, 524/445, 447, 451, 450, 514, 444, 456, 493, 425, 413, 492, 433, 449, 414, 112; 525/426

(56) References Cited

U.S. PATENT DOCUMENTS

| 3,893,969 A | | 7/1975 | Newbould et al. | |
| 4,065,519 A | | 12/1977 | Koch | |
| 4,289,668 A | * | 9/1981 | Li | 524/539 |
| 4,314,929 A | * | 2/1982 | Mahoney, Jr. | 524/444 |
| 4,399,246 A | * | 8/1983 | Hyde | 524/445 |
| 4,444,836 A | * | 4/1984 | Khattab | 524/493 |
| 4,452,858 A | * | 6/1984 | Take et al. | 524/456 |
| 4,655,964 A | * | 4/1987 | Steinberger et al. | 524/456 |
| 4,710,535 A | * | 12/1987 | Perrot et al. | 524/413 |
| 5,001,181 A | * | 3/1991 | Tagaki et al. | 524/492 |
| 5,036,127 A | | 7/1991 | Ueno et al. | |
| 5,073,590 A | * | 12/1991 | Abe et al. | 524/451 |
| 5,086,105 A | * | 2/1992 | Abe et al. | 524/492 |
| 5,104,925 A | * | 4/1992 | Honda et al. | 524/517 |
| 5,139,817 A | * | 8/1992 | Abe et al. | 427/322 |
| 5,140,059 A | * | 8/1992 | Simoens | 524/514 |
| 5,185,188 A | * | 2/1993 | Abe et al. | 427/322 |
| 5,206,284 A | * | 4/1993 | Fukui et al. | 524/445 |
| 5,219,940 A | * | 6/1993 | Nakano | 525/397 |
| 5,260,359 A | * | 11/1993 | Muehlbach et al. | 524/414 |
| 5,288,786 A | * | 2/1994 | Nishio et al. | 524/451 |
| 5,300,550 A | * | 4/1994 | Eckel et al. | 524/466 |
| 5,389,714 A | | 2/1995 | Ohtomo et al. | |
| 5,451,642 A | * | 9/1995 | Abe et al. | 525/179 |
| 5,470,909 A | * | 11/1995 | Nishii et al. | 524/449 |
| 5,474,853 A | * | 12/1995 | Watanabe et al. | 525/413 |
| 5,475,049 A | * | 12/1995 | Ohtomo et al. | 524/447 |
| 5,478,878 A | * | 12/1995 | Nagaoka et al. | 524/433 |
| 5,571,851 A | * | 11/1996 | Freeman et al. | |
| 5,631,070 A | * | 5/1997 | Nishii et al. | 525/391 |
| 5,703,164 A | * | 12/1997 | Nakano | 525/397 |
| 5,719,223 A | * | 2/1998 | Karg | 524/425 |
| 5,760,120 A | * | 6/1998 | Itoh et al. | 524/431 |

FOREIGN PATENT DOCUMENTS

| EP | 0 130 589 A2 | 1/1985 |
| EP | 0 244 090 A1 | 11/1987 |
| EP | 0 375 177 A2 | 6/1990 |
| EP | 0 585 056 A2 | 3/1994 |

* cited by examiner

Primary Examiner—Peter Szekely
(74) Attorney, Agent, or Firm—Piper Rudnick LLP

(57) ABSTRACT

Disclosed is a polyamide resin composition, a method for producing the composition, and articles from the composition. The polyamide resin composition polyamide resin composition is formed by melt-kneading (A) 100 parts by weight of nylon resin, and (B) 5–150 parts by weight of at least one of a non-fibrous inorganic filler having an average particle diameter of 0.05–10 μm and a fibrous inorganic filler, excluding glass fiber, having a fiber diameter of 0.05–10 μm. In the polyamide resin composition, an amount of a polyamide resin component deposit remaining on the inorganic filler when the inorganic filler is recovered by dissolving the polyamide resin composition into hexafluoroisopropanol is at least 4 g/m$^2$ per unit surface area of the inorganic filler measured by a BET method. The nylon resin composition is excellent in rigidity and toughness and particularly excellent in high-speed surface impact fracture characteristic. The resin composition also achieve excellent surface external appearance and excellent dimensional stability in good balance in a formed article. The resin composition can suitably be formed by injection forming, extrusion, blow forming and the like, into various vehicular exterior parts, under-hood formed parts for motor vehicles, portable device casings and the like.

14 Claims, 1 Drawing Sheet

POLYAMIDE RESIN COMPOSITION AND FORMING FROM THE SAME

BACKGROUND OF THE INVENTION

In order to meet growing demands for higher-performance engineering plastics, attempts have been made to improve characteristics of thermoplastic resin materials. For example, Polymer, 26, 1855(1985) describes the compounding of an elastomer component into nylon 66 wherein the elastomer component is finely dispersed so that a high impact strength is achieved. It is also known that the heat resistance or the rigidity of a resin material can be enhanced by adding an inorganic filler into the resin material. However, such an improvement in one characteristic by quality reforming is often accompanied by deterioration in another characteristic. For example, if an elastomer component is added to a material to improve impact strength or ductility, the heat resistance or rigidity of the material deteriorates. Conversely, if various inorganic fillers or reinforcing agents are compounded into materials to improve heat resistance or rigidity, the ductility of the material, such as Izod impact strength, tensile elongation, surface impact strength and the like, deteriorates. Therefore, it is difficult to improve the impact strength or ductility and the rigidity of a material at the same time.

It is also known that the compounding of a fibrous reinforcing material, such as glass fiber, improves rigidity and also notched Izod impact strength. In this known method, however, surface impact strength and notch-less Izod impact strength deteriorate in comparison with a non-reinforced material. Furthermore, the reduced elongation of the material or the influence of the orientation of the fibrous reinforcing material gives rise to problems of anisotropy in mechanical characteristics, warping or the like. Thus this method has adverse effects on engineering materials as well.

Various considerations have been made as to how to control or curb decreases in the impact strength or tensile elongation that occur if an inorganic filler, other than fibrous materials, is added to a resin material. For example, Japanese patent application laid-open No. Sho 61-36340 discloses a method in which glass beads are coated with at most 1% by weight of a coating material such as a silane compound, a fluorocarbon compound or the like. However, although the coated glass beads control the decrease in impact strength compared with materials containing non-coated glass beads, the impact strength of the materials containing coated glass beads is still lower than that of the materials containing no filler. In addition, it has been found that the disclosed method does not achieve sufficiently high tensile rupture elongation or sufficiently high surface impact strength.

Japanese patent application laid-open No. Sho 62-253652 discloses the melt-kneading of a resin, such as a polyphenylene-based resin, which has a high glass transition temperature, and a rubber-like polymer, unsaturated carboxylic acid together with polyamide for the purpose of achieving both a good impact resistance and a good heat resistance. However, this technology has drawbacks of insufficient heat resistance and insufficient dimensional stability. If an inorganic filler is merely added to overcome the drawbacks, there results considerable deterioration in impact resistance, high-speed surface impact fracture characteristic and tensile elongation, thus failing to provide a material with sufficiently improved characteristics.

SUMMARY OF THE INVENTION

The present invention relates to a polyamide resin composition that is excellent in rigidity and toughness and particularly excellent in tensile elongation, and high-speed surface impact fracture characteristic, and that achieves excellent surface external appearance and dimensional stability of formed articles in good balance. This invention also relates to a method for producing the polyamide resin composition, and articles formed from the polyamide resin composition.

According to a first aspect of the present invention, there is provided a polyamide resin composition substantially composed of (A) nylon resin, and (B) at least one of a non-fibrous inorganic filler having an average particle diameter of 0.05–10 μm and a fibrous inorganic filler, excluding glass fiber, having a fiber diameter of 0.05–10 μm is melt-kneaded together with the nylon resin (A), in a compounding amount of 5–150 parts by weight relative to 100 parts by weight of the nylon resin (A). The amount of a polyamide resin component deposit remaining on the inorganic filler when the inorganic filler is recovered by dissolving the polyamide resin composition into hexafluoroisopropanol is at least 4 g/m$^2$ per unit surface area of the inorganic filler measured by a BET method.

According to another aspect of the present invention, there is provided a method for producing a polyamide resin composition, wherein (A) 100 parts by weight of nylon resin, and (B)5–150 parts by weight of at least one of a non-fibrous inorganic filler having an average particle diameter of 0.05–10 μm and a fibrous inorganic filler, excluding glass fiber, having a fiber diameter of 0.05–10 μm are melt-kneaded, in such a manner that an amount of a polyamide resin component deposit remaining on the inorganic filler when the inorganic filler is recovered by dissolving the polyamide resin composition into hexafluoroisopropanol becomes at least 4 g/m$^2$ per unit surface area of the inorganic filler measured by a BET method.

According to still other aspects of the present invention, there are provided vehicle exterior parts, an under-hood part foaming for a motor vehicle, and a portable device casing which are formed from a polyamide resin composition substantially composed of (A) nylon resin, and (B) at least one of a non-fibrous inorganic filler having an average particle diameter of 0.05–10 μm and a fibrous inorganic filler, excluding glass fiber, having a fiber diameter of 0.05–10 μm which is melt-kneaded together with the nylon resin (A), in a compounding amount of 5–150 parts by weight relative to 100 parts by weight of the nylon resin (A). An amount of a polyamide resin component deposit remaining on the inorganic filler when the inorganic filler is recovered by dissolving the polyamide resin composition into hexafluoroisopropanol is at least 4 g/m$^2$ per unit surface area of the inorganic filler measured by a BET method.

DETAILED DESCRIPTION OF THE INVENTION

Figure 1:
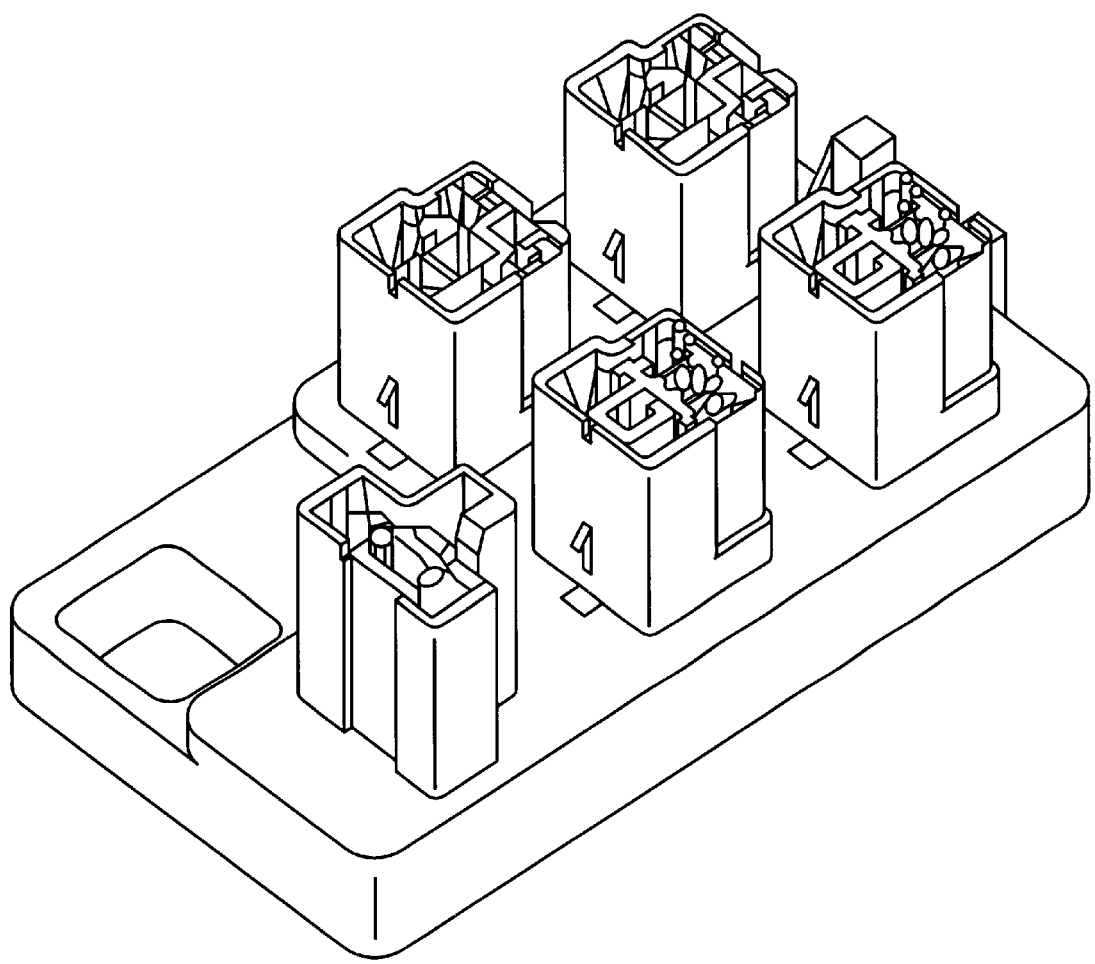
FIG. 1 is a perspective view of a relay box that was used in a sample evaluation of Examples of the present invention.

The present invention will be described in detail hereinafter with reference to the accompanying drawings. In the present application, "weight" also means "mass".

The polyamide resin used in the present invention is nylon whose main components are amino acid, lactam or diamine and dicarboxylic acid. Representative examples of the monomers forming the main component of the polyamide resin include, but are not limited to: amino acids such as 6-aminocaproic acid, 11-aminoundecanoic acid, 12-aminododecanoic acid, para-aminomethylbenzoic acid and the like; lactams such as ε-aminocaprolactam, ε-laurolactam the like; aliphatic or alicyclic or aromatic diamines such as tetramethylenediamine, hexamethylenediamine, 2-methylpentametylendiamine, undecamethylendiamine, dodecamethylenediamine, 2,2,4-/2,4,4-trimethylhexamethylene diamine, 5-methyl-nonamethylenediamine, meta-xylenediamine, para-xylylenediamine, 1,3-bis(aminomethyl)-cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethyle piperazine, and the like; and aliphatic alicyclic aromatic dicarboxylic acids such as adipic acid, suberic acid, azelaic acid, sebacic acid, dodecanedioic acid, terephthalic acid, isophtalic acid, 2-chloroterephtalic aicd, 2-methylterephtalic acid, 5-methylisophtalic acid, 5-sodium sulfoisophtalic acid, hexahydroterephtalic acid, hexahydroisophtalic acid and the like. In the present invention, nylon homopolymers or copolylmers derived from the aforementioned materials may be used individually or in the form of a mixture.

In the present invention, particularly useful nylon resins are nylon resins that have a melting point equal to or greater than 200° C. and that are excellent in heat resistance and strength. Specific examples of such nylon resins include, but are not limited to, polycaproamide (nylon 6), polyhexamethylene adipamide (nylon 66), polyhexamethylene adipamide (nylon 46), polyhexamethylene sebacamide (nylon 610), polyhexamethylene dodecamide (nylon 612), polyhexamethylene adipamide/polyhexamethyleneterephtalamide copolymer (nylon 66/6T), polyhexamethylene adipamide/polyhexamethyleneisophtalamide copolymer (nylon 55/6I), polyhexamethylene adipamide/polyhexa- methyleneterephtalamide copolymer (nylon 66/6T/6I), polyxylylene adipamide (nylon XD6), and mixtures of these material, and copolymers thereof.

Examples of particularly preferable examples include nylon 6, nylon 66, nylon 610, nylon 6/66 copolymer, nylon 6/12 copolymer, and the like. It is also preferable in practical applications to use mixtures of these polyamide resins in accordance with required characteristics, such as formability, heat resistance, toughness, surface characteristic, and the like.

The polymerization degree of the polyamide resins is not particularly limited. The relative viscosity of the polyamide resins measured in a 1% concentrated sulfuric acid solution at 25° C. is preferably within the range of 1.5–5.0 and, more preferably, within the range of 2.0–4.0.

In the present invention, examples of the particulate non-fibrous inorganic filler having an average particle diameter of 0.05–100 μm, which is used as component (B), include: silicates such as wollastonite, zeolite, sericite, kaolin, mica, clay, pyrophillite, bentonite, asbestos, talc, alumina silicate and the like; metal compounds such as alumina, silicon oxide, magnesium oxide, zirconium oxide, titanium oxide, iron oxide and the like; carbonates such as calcium carbonate, magnesium carbonate, dolomite and the like; sulfates such as calcium sulfate, barium sulfate and the like; hydroxides such as magnesium hydroxide, calcium hydroxide, aluminum hydroxide and the like; and other non-fibrous fillers such as glass beads, ceramic beads, boron nitride, silicon carbide and silica. The filler particles may be hollow. It is also possible to use two or more kinds of fillers as indicated above. Particularly preferred among these are talc, wollastonite, clay and kaolin. In particular, kaolin is a most preferable in order to provide ductility and rigidity in good balance.

The average particle diameter of the non-fibrous inorganic filler needs to be 0.05–10 μm. An average particle diameter thereof below 0.05 μm is not preferable, because the inorganic filler particles aggregate resulting in deterioration of ductility and deterioration of a molding surface. If the average particle diameter thereof exceeds 10 μm, molding surface deterioration becomes remarkable. The average particle diameter thereof is preferable 0.1–5 μm and, more preferably, 0.1–5 μm. The average particle diameter is determined by a precipitation method.

Specific examples of the fibrous inorganic filler having a fiber diameter of, 0.05–10 μm, which is used as component (B), include fibrous fillers such as potassium titanate whiskers, zinc oxide whiskers, aluminum borate whiskers, alumina fibers, silicon carbide fibers, ceramic fibers, asbestos fibers, plaster fibers, metal fibers, fibrous calcium carbonate, fibrous wollastonite and the like. These fillers may also be used in a combination of two or more kinds. Particularly preferred among these fillers are fibrous wollastonite and fibrous calcium carbonate. Use of a glass fiber is not preferable, because the improvement in ductility is small for an unknown reason.

The fiber diameter of the fibrous inorganic filler needs to be 0.05–10 μm A fiber diameter thereof less than 0.05 μm is not preferred, because the fibrous inorganic filler fibers become likely to aggregate, thereby degrading, ductility and molding surfaces. If the fiber diameter thereof exceeds 10 μm, molding surface deterioration becomes remarkable. The fiber diameter thereof is preferably 0.1–8 μm and, more preferably, 1–6 μm. The fiber diameter thereof is a number average fiber diameter measured using a microscope such as an electron microscope or the like.

It is preferable that the inorganic filler be used after being pre-treated with a coupling agent such as an isocyanate-based compound, an organic silane-based compound, an organic titanate-based compound, an organic borane-based compound, an epoxy compound and the like, in terms of obtaining further improvement in mechanical strength. Particularly preferred is an organic silane-based compound. Specific examples of the organic silane-based compound include, but are not limited to: epoxy group-containing alkoxysilane compounds such as γ-glycidoxypropyltrimethoxysilane, γ-glycidoxypropyltriethoxysilane, β-(3,4-epoxycyclohexyl) ethyltrimethoxysilane and the like; mercapto group-containing alkoxysilane compounds such, as γ-mercaptopropyltrimethoxysilane, γ-mercaptopropyl- triethoxysilane and the like; ureide group-containing alkoxysilane compounds such as γ-ureidepropyltrimethoxysilane, γ-(2-ureideethyl)aminopropyltrimethoxysilane and the like; isocyanato group-containing alkoxysilane compounds such as γ-isocyanatopropyltriethoxysilane, γ-isocyanatopropyltrimethoxysilane, γ-isocyanatopropylmethyldimethoxysilane, γ-isocyanatopropylmethyldiethoxysilanoe, γ-socyanatopropylethyldimethoxysilan, γ-isocyanatopropylethyldiethoxysilane, γ-iso- cyanatopropyltrichlorosilane and the like; amino group-containing alkoxysilane compounds such as γ-(2-aminoethyl) aminopropylmethyldimethoxysilane, γ-(2-aminoethyl) aminopropyltrimethoxysilane, γ-aminopropyltri- methoxysilane and the like; hydroxyl group-containing alkoxysilane compounds such as γ-hydroxypropyltrimethoxysilane, γ-hydroxypropyltriethoxysilane and the like; carbon-unsaturated group-containing alkoxysilane compounds such as γ-methacryloxypropyltrimethoxysilane, vinyltrimethoxysilane, N-β-(N-vinylbenzylaminoethyl)—γaminopropyltrimethoxysilane hydrochloride and the like. Particularly preferred as γ-methacryloxypropyltrimethoxysilane, γ-(2-aminoethyl) aminopropylmethyldimethoxysilane, γ-(2-aminoethyl) aminopropyltrimethoxysilane, γ-aminopropyl- trimethoxysilane. It is preferable that the silane coupling agent by used to pre-treat the filler by a normal method, and then melted and kneaded together with the polyamide resin. It is also possible to employ a so-called integral blend method wherein the pre-surface treatment of the filler is not performed, but the coupling agent is added when the filler and the polyamide resin are melted and kneaded.

In the present invention, the amount of the inorganic filler compounded relative to 100 parts by weight of the polyamide resin is, in total of the non-fibrous inorganic filler and the fibrous inorganic filler, within the range of 5–150 parts by weight and, desirably, within the range of 10–80 parts by weight. Preferably, the amount is within the range of 10–45 parts by weight in view of the balance between ductility and rigidity, tensile elongation, high-speed surface impact fracture characteristics.

In the present invention, it is necessary that the amount of the polyamide resin component deposited on the inorganic filler when the inorganic filler is recovered after the polyamide resin composition is dissolved into hexafluoroisoporpanol be at least 4 g/m$^2$ in an amount per unit area of the inorganic filler measured by a BET method.

The aforementioned amount of polyamide resin component deposition may be determined as follows. First, the polyhexamethylene is dissolved into hexafluoroisoporpanol so that the concentration of the polyamide resin component becomes 10% by weight. The obtained suspension is centrifuged to separate the inorganic filler by precipitation. The thus-separated inorganic filler is again suspended in hexafluoroisoporpanol to a concentration of 10% by weight, and then centrifuged for separation. The recovered fraction is dried by a vacuum drier until no solvent remains. The obtained filler is subjected to measurement by an infrared spectrophotometer. Based on the polyamide characteristic absorption and the calibration curve of the characteristic absorption of the filler, the polyamide resin component deposited on the filler is quantified (hereinafter, referred to as method (1)). If polyamide is considered to be substantially only the nitrogen-containing component among the components deposited on the filler, the recovered filler may be subjected to an elemental analysis to quantify the nitrogen content, whereby the amount of nylon deposit can be determined (method (2)). In addition, if the substantially entire components deposited on the filler are considered to be the polyamide resin component, as in a composition, for example wherein relative to 100% by weight of polyamide resin/filler/polyamide resin, 1% by weight of compounds or the like is present, the obtained filler may be subjected to a thermogravimeter, wherein the filler is heated to 500° C. at a rate of 20° C./min, and kept at 500° C. for 15 minutes to determine a loss on heating. Thereby, the substantial amount of the polyamide resin component can be determined (method (3)). If a component, such as a polymer, which is substantially insoluble in hexafluoroisoporpanol, is contained as an additional component in the composition of the present invention, a method to remove the insoluble component using an appropriate solvent or the like, or a like method, needs to be performed before determination of the amount of the polyamide resin component deposit based on the infrared spectrophotometric determination or elemental analysis as described above.

To achieve the advantages of the invention, it is essential that at least a predetermined amount of polyamide resin component be deposited on the filler. If the amount of polyamide resin component deposit on the filler is less than 4 g/m$^2$, the improvement in surface characteristics and the achievement of tensile elongation and ductile fracture characteristics in high speed surface impact become insufficient. Thus, such a small amount is not preferable. The amount of the deposit needs to be at least 4 g/m$^2$ and, preferably, at least 5 g/m$^2$.

In the present invention, it is possible to use a glass fiber together with the aforementioned inorganic filler as long as the presence of the glass fiber does not adversely affect the advantages of the invention. If a glass fiber is used, it is preferable that the aforementioned amount of the deposit be at least 4 g/m$^2$ relative to the total amount of the inorganic filler including the glass fiber.

A preferred method for increasing the amount of nylon deposited on the filler is to add an olefin compound having in its molecule a carboxylic anhydride group, or a polymer of the olefin compound, either of which can be used as component (C) according to the invention. Specific examples of the olefin compound having in its molecule a carboxylic anhydride group or the polymer of the olefin compound include maleic anhydride, itaconic acid anhydride, glutaconic acid anhydride, citraconic acid anhydride, aconitic acid anhydride, polymers of any of these anhydrides, and the like. The olefin compound polymer may contain a small amount of a copolymerized olefin component other than the olefin components having a carboxylic anhydride group, such as styrene, isobutylene, methacrylic acid ester, acrylic acid ester and the like, that is, a small amount that does not adversely affect the advantages of the invention. However, it is preferable that the olefin compound polymer be substantially formed of a polymer of an olefin compound that has in its molecule a carboxylic anhydride group. The polymerization degree of the olefin compound polymer is preferably 2–100 and, more preferably, 2–50 and, most preferably, 2–20. Among the aforementioned materials, maleic anhydride and polymaleic anhydride are most preferably used due to their high performance in providing ductile fracture characteristic and rigidity. For example, a polymaleic anhydride described in J. Macromol. Sci. -Revs. Macromol. Chem. C13(2), 235 (1975) or the like may be used.

The amount of the olefin compound or olefin compound polymer added is preferably 0.05–10 parts by weight relative to 100 parts by weight of the polyamide resin, in view of improvement in ductility and fluidity of the obtained composition. The amount is more preferably within the range of 0.1–5 parts by weight and, still more preferably, 0.1–3 parts by weight and, further more preferably, 0.1–1 part by weight.

The olefin compound having in its molecule a carboxylic anhydride group or the polymer of the olefin compound needs only to substantially have an anhydride structure at the time of melting and kneading together with the polyamide resin. It is possible to hydrolyze the olefin compound or the olefin compound polymer and use the obtained carboxylic acid or an aqueous solution thereof or in an other form in the process of melting and kneading, whereby heat provided during the melting and kneading process causes dehydration of the carboxylic acid or the aqueous solution thereof or the like. Thus, the material substantially in the form of an anhydride is melted and kneaded together with a nylon resin.

In a case where polyamide is to be alloyed with a material poor in compatibility with polyamide, such as polyolefin, polyphenylene oxide or the like, it is a conventional practice to make the polymers compatible with each other by melting and kneading maleic anhydride with polyolefin or polyphenylene oxide in the presence of a peroxide so that polyolefin or polyphenylene oxide graft-polymerizes with maleic anhydride, and by further kneading polyamide with the polymerized material so that the grafted maleic anhydride react with amino groups. Thus, it is a conventional practice to further add a filler to the composition (see, for example, Japanese patent application laid-open Nos. Hei 1-311146 and Hei 3-163164). However, such a technique is insufficient to increase the amount of polyamide resin component deposit on the filler according to the invention, because maleic anhydride is consumed mainly for improvements in the compatibility with nylon. In other words, the technique cannot provide a sufficient ductility, which is an advantage of the invention.

Furthermore, the polyamide resin composition of the present invention may contain various additives that include: crystalline nucleus agents such as organic phosphorous compound, polyether ether ketone and the like; anti-coloring agents such as hypophosphorous acid salts and the like; antioxidants such as hindered phenol, hindered amine and the like; heat stabilizers; lubricants; UV protection agents; coloring agents; and the like.

The method for preparing the polyamide resin composition of the present invention is not limited to a particular method as long as the method meets the requirements defined according to the present invention. A specific and efficient, but not restrictive, example of the preparation method is a method wherein a mixture of materials, that is, polyamide resin, an inorganic filler and a particular olefin compound or a polymer of the olefin compound, is supplied to a known melting and kneading machine, such as a single-screw or double-screw extruder, a Banbury mixer, a kneader, a mixing roll or the like, and the mixture is then melted and kneaded at a temperature of 220–330° C. in accordance with the melting point of the nylon resin used.

However, to obtain the composition of the present invention, it is necessary that at least a predetermined amount of the polyamide resin component be deposited on the filler. To accomplish this, the kneading conditions need to be sufficiently controlled. For example, if a melt kneader is used, it is necessary to control the kneader L/D (screw length/screw diameter), vent, kneading time, dwell time, positions at which the individual components are added, and the amounts added. Normally, an increased LD and an increased dwell time in a melt kneader increase the amount of deposit on the filler and, therefore, are preferable. It is also preferred in this case that the polyamide, the filler and the specified olefin compound of the polymer of the olefin compound sufficiently contact one another during the melt kneading. Therefore, the co-presence of a large amount of a polymer component that impedes the contact between the materials is unpreferred. For example, polyphenylene ether may be added to the polyamide resin composition of the present invention in such an amount that the advantages of the present invention are not adversely affected. The amount of polyphenylene ether is preferably less than 40 parts by weight relative to 100 parts by weight of polyamide.

The thus-obtained nylon resin composition of the present invention is excellent being in good balance among formed article surface external appearance, dimensional stability, high-speed surface ductile fracture characteristic, rigidity, ductility and tensile elongation. The nylon resin composition is particularly useful for applications to articles that are formed by injection molding, extrusion forming, blow molding or the like. The polyamide resin composition of the present invention is very useful and practical in applications to vehicular exterior parts. Due to this advantage, the polyamide resin composition of the present invention can be suitably used for various exterior parts of not only motor vehicles but also motor cycles, bicycles, toy vehicles, carts, and the like. Examples of automotive exterior parts to which the polyamide resin composition of the present invention can be suitably applied include: exterior parts such as fenders, bumpers, bumper facers, spoilers, wheel caps, center wheel caps and the like; vehicle-loaded luggage holding tools; on-board trunks; windscreens for trucks or the like; and parts thereof. Examples of the applications in motor cycles include cowlings, fenders, various covers, gasoline tanks and the like. Examples of the applications in bicycles include mudguards, saddles, load-carrying platforms and the like. Particularly preferred are the applications to wheel caps, spoilers and fenders. The polyamide resin composition is also useful for automotive under-hood parts, for example, covers such as engine covers, engine cover coverings, cylinder head covers, timing belt covers and the like, connectors such as wire harness connectors and the like, boxes such as junction boxes, relay boxes, fuse boxes and the like. The polyamide resin composition is particularly useful for the relay boxes and the junction boxes. Furthermore, the composition of the present invention is useful for cases or casings of portable devices that include portable computers such as notebook personal computers, electronic pocketbooks and the like, portable communication devices such as pagers, cellular phones, personal handy phones (PHS), wireless transceivers, facsimiles and the like, portable audio appliances such as radios, cassette players, CD players and the like, flash lights, battery containers, and the like.

EXAMPLES

The present invention will be further described in detail with reference to Examples. However, the present invention is not limited by the following descriptions. All the compounding proportions indicated in the description of Examples and Comparative Examples are parts or part by weight.

In the following examples, the measurements of material strength, formed article surface smoothness and amount of polyamide resin deposit, the measurement of surface area and the evaluation of high-speed surface impact were performed by methods described below.

[Material Strength]

The material strength was measured by the following standard methods.

Tensile strength: ASTM D638
Bending elastic coefficient: ASTM D790
Izod impact strength: ASTM D256

[Surface Smoothness]

Rectangular plates of 80×80×3 mm were formed by injection. The clearness of a reflection of a fluorescent lamp on a surface of each plate formed, by the unaided eye, to determine indications of smoothness.

○: The outline of the fluorescent lamp was clearly observed.
Δ: The outline of the fluorescent lamp was blurred.
χ: No image of the fluorescent lamp was observed.

[Measurement of Surface Area by BET Method]

Chips of resin compositions obtained by melt kneading were heated in air at 500° C. for 5 hours, to obtain a filler as an ash content. Using BELSORP 36 (by Nippon Bell Kabushiki Gaisha), nitrogen gas adsorbed to the filler for measurement.

[Measurement of Amount of Polyamide Resin Component Deposit on Inorganic Filler]

The filler obtained as an ash content and a polyamide resin were mixed in the form of powder. Infrared absorptions of the mixtures were measured using an infrared spectrophotometer and, based on the measured absorptions, a working curve was prepared. Using hexafluoroisopropanol, the inorganic filler was separated from the polyamide resin composition by the above-described method. The infrared absorption of the inorganic filler was measured. Using the prepared working curve, the amount of nylon deposit was quantified (method (1)).

If the composition contained at most 1 part by weight of an olefin compound having in its molecule a carboxylic anhydride group or a polymer of the olefin compound, relative to 100 parts by weight of the polyamide resin/inorganic filler/polyamide resin, the value of the heating loss of the inorganic filler recovered using hexafluoroisopropanol (method (3)) was in good accordance with the value determined by infrared absorption as described above (method (1)) within an error range. In the case of a composition wherein the nitrogen content derived from the other additives was at most 1 part by weight relative to 100 parts by weight of the nitrogen content derived from the polyamide resin, the quantified value of the polyamide resin component based on the elemental analysis (method (2)) was in good accordance with the value determined by infrared absorption (method (1)).

[High-Speed Surface Impact Test]

Using a Servo Pulser EHF-U2H-20L Model high-speed surface impact tester manufactured by Shimazu Seisakusho, rectangular plate samples of 2 mm in thickness were tested under the conditions of 23° C., punch tip diameter being ⅝ inch, and impact speed being 2.5 m/s.

Example 1

The melt-kneading of a polyamide resin, an inorganic filler and an olefin compound having in its molecule a carboxylic anhydride group or a polymer of the olefin compound was performed using a TEX30 Model double-screw extruder (L/D=45.5) manufactured by Nippon Seikousho. 100 parts by weight of nylon 6 resin having a relative viscosity of 2.70, 16 parts by weight of kaolin surface-treated with aminosilane having a particle diameter of 0.8 $\mu$m, and 0.4 part by weight of maleic anhydride relative to 100 parts by weight of the nylon resin were drive-blended. The entire amount of the mixture was supplied to the feeder of the extruder being operated in conditions of a cylinder temperature of 260° C. and a screw revolution speed of 150 rpm, thereby performing the melt-kneading of the mixture. The extrudate was cooled, and then formed into pellets by a pelletizer.

The pellets were injection-formed into various test pieces for measurements of surface smoothness, material strength, high-speed surface impact and the like. Results are shown in Table 1. Amounts of polyamide resin component deposit were determined by-method (1), method (2) and method (3). The determined amounts were in accordance with each other within an error range.

TABLE 1

|  | Example 1 | Example 2 | Example 3 | Example 4 | Example 5 |
|---|---|---|---|---|---|
| Nylon resin |  |  |  |  |  |
| Kind | Nylon 6(*1) | Nylon 6(*1) | Nylon 6(*1) | Nylon 6(*1) | Nylon 66(*2) |
| Amount added (parts by weight) | 100 | 100 | 100 | 100 | 100 |
| Inorganic filler |  |  |  |  |  |
| Kind | Kaolin(*3) | Kaolin(*3) | Wollastonite(*4) | Kaolin(*3) | Kaolin(*3) |
| Amount added (parts by weight) | 16 | 16 | 16 | 16 | 12 |
| Additive |  |  |  |  |  |
| Kind | Maleic anhydride | Maleic anhydride | Maleic anhydride | Polymaleic anhydride | Maleic anhydride |
| Amount added (parts by weight) | 0.4 | 0.7 | 0.4 | 1 | 0.4 |
| Extruding method | A | A | A | A | A |
| Nylon deposit (g/m$^2$) | 4 | 9 | 4 | 5 | 4 |
| Tensile elongation (%) | 160 | 180 | 20 | 165 | 50 |
| Bending elastic coefficient GPa | 3.3 | 3.3 | 3.5 | 3.3 | 3.6 |
| Izod impact strength (J/m) | 80 | 90 | 325 | 82 | 60 |
| High-speed surface impact |  |  |  |  |  |
| Fracture energy (J) | 56 | 60 | 35 | 58 | 40 |
| Fracture bending (mm) (J) | 19 | 23 | 15 | 20 | 16 |
| Surface smoothness | ○ | ○ | Δ | ○ | ○ |

(*1)nylon 6 havig a relative viscosity of 2.70
(*2)nylon 66 having a relative viscosity of 2.95
(*3)average particle diameter of 0.8 $\mu$m (precipitation method), aminosilane-treated, surface area of 11.2 m2/g
(*4)diameter of 4 $\mu$m (by electron microscopic measurement), aspect ratio of 20, methacryloxysilane-treated, surface area of 1.9 m2/g
(*5)polymaleic anhydride having an average polymerization degree of 8
Extruding method
A: entire amount from main feeder Comparative Example 1

The kneading, pelletization, injection forming and property measurement were performed substantially in the same manners as described in Example 1, except that maleic anhydride was not added. Amounts of polyamide resin component deposit were measured by method (1), method (2) and method (3), and were in accordance with each other. Results are shown in Table 2. With regard to the composition obtained herein, the amount of polyamide resin component deposit on the inorganic filler was small, and the tensile rupture elongation, impact value and high-speed surface impact characteristic thereof were insufficient compared with those of the composition of the present invention exhibited in Example 1.

Furthermore, if the kind of nylon resin or the kind of inorganic filler was changed, improvements were still achieved in tensile elongation, impact strength, high-speed surface impact characteristic and surface smoothness, in comparison with the cases where an olefin compound having

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Nylon resin | | | | | | | |
| Kind | Nylon 6(*1) | Nylon 6(*1) | Nylon 6(*1) | Nylon 6(*1) | Nylon 66(*2) | Nylon 6(*1) | Nylon 6(*1) |
| Amount added (parts by weight) | 100 | 100 | 100 | 100 | 100 | 100 | 100 |
| Inorganic filler | | | | | | | |
| Kind | Kaolin(*3) | Kaolin(*3) | Kaolin(*3) | Wollastonite(*4) | Kaolin(*3) | Glass fiber(*6) | Glass fiber(*6) |
| Amount added (parts by weight) | 16 | 16 | 16 | 16 | 12 | 17.6 | 17.6 |
| Additive | | | | | | | |
| Kind | — | Maleic anhydride | Maleic anhydride | — | — | — | Maleic anhydride |
| Amount added (parts by weight) | — | 0.4 | 0.4 | — | — | — | 0.4 |
| Extruding method | A | B | A(*7) | A | A | C | C |
| Nylon deposit (g/m$^2$) | 2 | 3 | 2.5 | 1 | 2 | 2.5 | 2.6 |
| Tensile elongation (%) | 10 | 15 | 13 | 12 | 13 | 4 | 5 |
| Bending elastic coefficient GPa | 3.3 | 3.3 | 3.3 | 3.6 | 3.6 | 5 | 5 |
| Izod impact strength (J/m) | 40 | 42 | 42 | 120 | 40 | 59 | 65 |
| High-speed surface impact | 25 | 28 | 26 | 30 | 23 | 2.1 | 2.5 |
| Fracture energy (J) | | | | | | | |
| Fracture bending (mm) | 10 | 14 | 13 | 11 | 13 | 2 | 2.5 |
| Surface smoothness | Δ | Δ | Δ | X | Δ | X | X |

(*1)nylon 6 having a relative viscosity of 2.70
(*2)nylon 66 having a relative viscosity of 2.95
(*3)average particle diameter of 0.8 μm (precipitation method), aminosilane-treated, surface area of 11.2 m2/g
(*4)diameter of 4 μm (by electron microscopic measurement), aspect ratio of 20, methacryloxysilane-treated, surface area of 1.9 m2/g
(*6)glass fiber having a fiber diameter of 13 m, a surface area of 0.12 m2/g
Extruding method
A: entire amount from main feeder
Screw speed of 80 rpm for *7
B: nylon and inorganic filler fed by main feeder, only additive fed by side feeder
C: only nylon fed by main feeder, glass fiber and additive fed by side feeder.

Examples 2–5

Comparative Examples 2–7

The kneading, pelletization, injection forming and property measurement were performed substantially in the same manners as described in Example 1, except that the kinds or compounding amounts of polyamide resin, inorganic filler and olefin compound having in its molecule a carboxylic anhydride group, and the like, and the extruding method were changed as shown in Tables 1 and 2. Results are shown in Tables 1 and 2. Amounts of polyamide resin component deposit in Examples 2–5 and Comparative Examples 2–5 were measured by method (1), method (2) and method (3), and were in accordance with each other. For Comparative Examples 6 and 7, method (2) was used for the measurement.

As indicated by Comparative Examples 2 and 3, if the extruding conditions were not appropriate although the composition was the same as that of Example 1, the amount of polyamide resin component deposit on the inorganic filler became insufficient, and the obtained formings were apparently inferior in tensile elongation, impact strength, high-speed surface impact characteristic and surface smoothness.

in its molecule a carboxylic anhydride group or a polymer of the olefin compound was not added. In the cases where glass fiber was used, no remarkable improvement was observed (Comparative Examples 6 and 7).

Example 6

Comparative Examples 8, 9

The kneading, pelletization, injection forming and property measurement were performed substantially in the same manners as described in Example 1, except that polyamide resin, inorganic filler, polyphenylene oxide resin and maleic anhydride were compounded as shown in Table 3. Results are shown in Tables 3. Polyphenylene oxide was removed using chloroform. The amount of nylon deposited on the filler was measured by the infrared spectroscopic method (method (1)) and the elemental analysis method (method (2)). The measurements thereby were in accordance with each other within an error range. If polyphenylene was added in a large amount, the amount of nylon deposit decreased, thereby failing to achieve good characteristics.

TABLE 3

|  | Example 6 | Example 8 | Example 9 | Example 10 |
|---|---|---|---|---|
| Nylon resin |  |  |  |  |
| Kind | Nylon 6(*1) | Nylon 6(*1) | Nylon 6(*1) | Nylon 6(*1) |
| Amount added (parts by weight) | 100 | 100 | 100 | 100 |
| Inorganic filler |  |  |  |  |
| Kind | Kaolin (*3) | Kaolin (*3) | Kaolin (*3) | Kaolin (*3) |
| Amount added (parts by weight) | 16 | 16 | 16 | 16 |
| Additive |  |  |  |  |
| Kind | Maleic anhydride | Maleic anhydride | Maleic anhydride | Maleic anhydride |
| Amount added (parts by weight) | 0.5 | 0 | 0.5 | 0 |
| PPO(*) | 10 | 10 | 45 | 45 |
| Extruding method | A | A | A | A |
| Nylon deposit (g/m2)) | 5 | 1.8 | 1.8 | 1.2 |
| Tensile elongation (%) | 130 | 6 | 30 | 15 |
| Bending elastic coefficient GPa | 3.6 | 3.6 | 3.4 | 3.4 |
| Izod impact strength (J/m) | 70 | 35 | 40 | 30 |
| High-speed surface impact |  |  |  |  |
| Fracture energy (J) | 50 | 23 | 30 | 30 |
| Fracture bending (mm) | 16 | 8 | 8 | 6 |
| Surface smoothness | ○ | Δ | Δ | Δ |

(*1)nylon 6 having a relative viscosity of 2.70
(*3)average particle diameter of 0.8 μm (precipitation method), aminosilane-treated, surface area of 11.2 m2/g
(*8)using poly(2,6-dimethyl-1,4-phenylene) having an intrinsic viscosity of 0.5 dL/g (at 30 C. in chloroform solution)
Extruding method
A: entire amount from main feeder

Example 7

Comparative Example 11

Full wheel caps of 14 inches in diameter were formed by injection using the pellets of Example 1 and Comparative Example 1, as shown in Table 4. The surface smoothness of the articles was evaluated. A thin-wall flat portion (2 mm in thickness) was cut out from the full wheel cap of each Example 7 and Comparative Example 11, and was subjected to the high-speed surface impact test under the same conditions as described above. An increase in the amount of polyamide resin component deposit improved high-speed surface impact characteristics and surface smoothness as indicated in Table 4.

Example 8

Comparative Example 12

Relay boxes as shown in FIG. 1 were formed using the pellets of Example 1 and Comparative Example 1, as shown in Table 4. The surface smoothness of the articles was evaluated. A platy portion of the article of each Example 8 and Comparative Example 12 was cut out, and was subjected to the high-speed surface impact test. The strength of lance portions of the relay boxes was measured by a tension test as follows. A metallic terminal connected to a copper wire was inserted into a lance portion provided in a terminal inserting opening of each relay box. The relay box was secured using a tension tester, and the copper wire was subjected to a tension test, thereby measuring a strength of a lance. The strength of the lance in Example 8 (the composition of Example 1) was 9.5 kgf while the strength of the lance in Comparative Example 12 (the composition of Comparative Example 1) was 8.8 kgf. The higher strength of the lance in Example 8 is considered to correspond to the superiority of the composition of Example 1 in overall material characteristics.

TABLE 4

|  | Example 7 | Comparative Example 11 | Example 8 | Comparative Example 12 | Example 9 | Comparative Example 13 |
|---|---|---|---|---|---|---|
| Molding | Full wheel cap | | Relay box | | Computer casing | |
| Pellets used | Example 1 | Comparative Example 1 | Example 1 | Comparative Example 1 | Example 1 | Comparative Example 1 |
| High-speed surface impact | | | | | | |
| Fracture energy (J) | 60 | 26 | 59 | 23 | 62 | 25 |
| Fracture bending (mm) | 20 | 11 | 17 | 8 | 19 | 10 |
| Surface smoothness | ○ | Δ | ○ | Δ | ○ | Δ |

Example 9

Comparative Example 13

Portable pocket-size computer casings having a width of 20 cm, a depth of 12 cm and a thickness of 1.5 cm were formed by injection using the pellets of Example 1 and Comparative Example 1 as shown in Table 4. The surface smoothness of the casings was evaluated. A thin-wall flat portions (2 mm in thickness) was cut out from each casing, and was subjected to the high-speed surface impact test under the same conditions as described above. The results indicate that an increase in the amount of polyamide resin component achieved improvements in high-speed surface impact characteristic and surface smoothness.

What is claimed is:

1. A melt blended polyamide resin composition comprising:
   (A) 100 parts by weight of nylon resin;
   (B) 5–150 parts by weight of at least one inorganic filler selected from the group consisting of wollastonite, zeolite, sericite, kaolin, mica, clay, pyrophillite, bentonite, asbestos, talc, aluminum silicate; metal compounds selected from the group consisting of alumina, silicon oxide, magnesium oxide, zirconium oxide, titanium oxide, and iron oxide; carbonates selected from the group consisting of calcium carbonate, magnesium carbonate, and dolomite; sulfates selected from the group consisting of calcium sulfate and barium sulfate; hydroxides selected from the group consisting of magnesium hydroxide, calcium hydroxide and aluminum hydroxide; and other non-fibrous fillers selected from the group consisting of glass beads, ceramic beads, boron nitride, and silicon carbide, said filler having an average particle diameter of 0.05–10 $\mu$m, and
   (C) 0.05–10 parts by weight of an olefin anhydride which is at least one selected from the group consisting of maleic acid anhydride, itaconic acid anhydride, glutaconic acid anhydride, citoraconic acid anhydride and aconitic acid anhydride or a polymer of maleic acid anhydride melt kneaded together,
      wherein in a subsequent test, the amount of said melt-kneaded polyamide resin component deposit remaining on said inorganic filler when said inorganic filler is recovered by dissolving the polyamide resin composition into hexafluoroisopropanol is at least 4 g/m$^2$ per unit surface area of said inorganic filler, as measured by the BET method.

2. A polyamide resin composition according to claim 1, wherein said nylon resin is at least one selected from the group consisting of aliphatic nylon resins whose melting points are at least 200° C.

3. A polyamide resin composition according to claim 1, wherein the nylon resin is at least one selected from the group consisting of nylon 66 and nylon 6.

4. A polyamide resin composition according to claim 1, wherein a polyphenylene oxide resin is not added in an amount equal to or greater than 40 parts by weight relative to 100 parts by weight of polyamide resin.

5. A melt blended polyamide resin composition comprising:
   (A) 100 parts by weight of nylon resin;
   (B) 5–150 parts by weight of at least one of a non-fibrous inorganic filler having an average particle diameter of 0.05–10 $\mu$m, and a fibrous inorganic filler, excluding glass fiber, having a fiber diameter of 0.05–10 $\mu$m; and
   (C) 0.05–10 parts by weight of an olefin anhydride which is at least one selected from the group consisting of maleic acid anhydride, itaconic acid anhydride, glutaconic acid anhydride, citoraconic acid anhydride and aconitic acid anhydride or a polymer of maleic acid anhydride melt kneaded together,
      wherein in a subsequent test, the amount of said polyamide resin component deposit remaining on said inorganic filler when the inorganic filler is recovered by dissolving the polyamide resin composition into hexafluoroisopropanol is at least 4 g/m$^2$ per unit surface area of the inorganic filler, as measured by the BET method.

6. The composition defined in claim 1 wherein said inorganic filler is at least one species selected from the group consisting of kaolin, wollastonite and talc.

7. A melt blended polyamide resin composition consisting essentially of:
   (A) 100 parts by weight of nylon resin;
   (B) 5–150 parts by weight of at least one inorganic filler selected from the group consisting of wollastonite, zeolite, sericite, kaolin, mica, clay, pyrophillite, bentonite, asbestos, talc, aluminum silicate; metal compounds selected from the group consisting of alumina, silicon oxide, magnesium oxide, zirconium oxide, titanium oxide, and iron oxide; carbonates selected from the group consisting of calcium carbonate, magnesium carbonate, and dolomite; sulfates selected from the group consisting of calcium sulfate and barium sulfate; hydroxides selected from the group consisting of magnesium hydroxide, calcium hydroxide and aluminum hydroxide; and other non-fibrous fillers selected from the group consisting of glass beads, ceramic beads, boron nitride, and silicon carbide,
      said filler having an average particle diameter of 0.05–10 $\mu$m, and
   (C) 0.05–10 parts by weight of an olefin anhydride which is at least one selected from the group consisting of maleic acid anhydride, itaconic acid anhydride, glutaconic acid anhydride, citoraconic acid anhydride and aconitic acid anhydride or a polymer of maleic acid anhydride, wherein in a subsequent test, the amount of said melt-kneaded polyamide resin component deposit remaining on said inorganic filler when said inorganic filler is recovered by dissolving the polyamide resin composition into hexafluoroisopropanol is at least 4 g/m$^2$ per unit surface area of said inorganic filler, as measured by the BET method.

8. A polyamide resin composition according to claim 7, wherein said nylon resin is at least one selected from the group consisting of aliphatic nylon resins whose melting points are at least 200° C.

9. A polyamide resin composition according to claim 7, wherein the nylon resin is at least one selected from the group consisting of nylon 66 and nylon 6.

10. A polyamide resin composition according to claim 7, further comprising polyphenylene oxide resin in an amount equal to or less than 40 parts by weight relative to 100 parts by weight of polyamide resin.

11. A melt blended polyamide resin composition consisting essentially of:
    (A) 100 parts by weight of nylon resin;
    (B) 5–150 parts by weight of at least one of a non-fibrous inorganic filler having an average particle diameter of 0.05–10 $\mu$m, and a fibrous inorganic filler, excluding glass fiber, having a fiber diameter of 0.05–10 $\mu$m; and
    (C) 0.05–10 parts by weight of an olefin anhydride which is at least one selected from the group consisting of maleic acid anhydride, itaconic acid anhydride, glutaconic acid anhydride, citoraconic acid anhydride and aconitic acid anhydride or a polymer of maleic acid anhydride,
       wherein in a subsequent test, the amount of said polyamide resin component deposit remaining on said inorganic filler when the inorganic filler is recovered by dissolving the polyamide resin composition into hexafluoroisopropanol is at least 4 $g/m^2$ per unit surface area of the inorganic filler, as measured by the BET method.

12. A polyamide resin composition according to claim 11, wherein said nylon resin is at least one selected from the group consisting of aliphatic nylon resins whose melting points are at least 200° C.

13. A polyamide resin composition according to claim 11, wherein the nylon resin is at least one selected from the group consisting of nylon 66 and nylon 6.

14. A polyamide resin composition according to claim 11, further comprising polyphenylene oxide resin in an amount equal to or less than 40 parts by weight relative to 00 parts by weight of polyamide resin.

* * * * *

UNITED STATES PATENT AND TRADEMARK OFFICE
CERTIFICATE OF CORRECTION

PATENT NO. : 6,617,381 B1 Page 1 of 1
DATED : September 9, 2003
INVENTOR(S) : Kumaki et al.

It is certified that error appears in the above-identified patent and that said Letters Patent is hereby corrected as shown below:

Column 4,
Line 9, please change "0.1-5$\mu$m" to -- 0.1-3 $\mu$m --; and
Line 67, please change "γaminopropyltrimethoxysilane" to
-- γ-aminopropyltrimethoxysilane --.

Column 13,
Table 4, at "Fracture energy (J)", at Example 8, please change "59" to -- 58 --.

Column 18,
Line 3, please change "00" to -- 100 --.

Signed and Sealed this

Twenty-fourth Day of February, 2004

JON W. DUDAS
*Acting Director of the United States Patent and Trademark Office*